US011471900B2

(12) United States Patent
Tix et al.

(10) Patent No.: US 11,471,900 B2
(45) Date of Patent: Oct. 18, 2022

(54) HEATED WHIP HOSE

(71) Applicant: Graco Minnesota Inc., Minneapolis, MN (US)

(72) Inventors: Joseph E. Tix, Hastings, MN (US); Nicholas P. Peterson, Coon Rapids, MN (US); Nicholas K. Studt, Moscow, ID (US); Stephen P. Schneider, Blaine, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 17/564,898

(22) Filed: Dec. 29, 2021

(65) Prior Publication Data

US 2022/0203388 A1   Jun. 30, 2022

Related U.S. Application Data

(60) Provisional application No. 63/132,153, filed on Dec. 30, 2020.

(51) Int. Cl.
*F16L 53/00* (2018.01)
*B05B 7/16* (2006.01)
*F16L 53/38* (2018.01)
*F16L 59/02* (2006.01)
*F16L 11/127* (2006.01)
*F16L 11/08* (2006.01)

(52) U.S. Cl.
CPC .......... *B05B 7/1693* (2013.01); *F16L 11/085* (2013.01); *F16L 11/127* (2013.01); *F16L 53/38* (2018.01); *F16L 59/029* (2013.01)

(58) Field of Classification Search
CPC ........ F16L 53/38; F16L 11/085; F16L 11/127; F16L 59/029; B05B 7/1693
USPC .................................. 138/33, 125, 133, 149
See application file for complete search history.

(56) References Cited

U.S. PATENT DOCUMENTS

| 2,915,615 | A | * | 12/1959 | Leipold | ..................... | H05B 3/56 |
| | | | | | | 338/214 |
| 3,240,234 | A | * | 3/1966 | Bond, Jr. | ............... | F16L 11/118 |
| | | | | | | 174/15.5 |
| 3,355,572 | A | * | 11/1967 | Chrow | ..................... | F16L 53/38 |
| | | | | | | 219/535 |
| 3,462,544 | A | * | 8/1969 | King | ..................... | H01B 7/292 |
| | | | | | | 174/124 R |
| 3,727,029 | A | | 4/1973 | Chrow | | |
| 4,194,536 | A | | 3/1980 | Stine et al. | | |
| 4,455,474 | A | | 6/1984 | Jameson et al. | | |

(Continued)

FOREIGN PATENT DOCUMENTS

CN    209414795 U    9/2019

OTHER PUBLICATIONS

Extended European Search Report for EP Application No. 21218210.9, dated May 9, 2022, 10 pages.

(Continued)

*Primary Examiner* — James F Hook
(74) *Attorney, Agent, or Firm* — Kinney & Lange, P.A.

(57) ABSTRACT

A heated whip hose includes a hose core configured to deliver a fluid, a heating element disposed around the hose core, a protective layer disposed around the heating element and hose core, an insulating layer disposed around the protective layer, and an abrasion protection layer disposed around insulating layer and forming an outer sheath.

26 Claims, 3 Drawing Sheets

(56) References Cited

U.S. PATENT DOCUMENTS

| | | | | |
|---|---|---|---|---|
| 4,553,023 A | * | 11/1985 | Jameson | F16L 53/38 |
| | | | | 137/341 |
| 4,653,541 A | * | 3/1987 | Oehlschlaeger | F17D 5/04 |
| | | | | 138/104 |
| 4,667,084 A | | 5/1987 | Regge | |
| 5,632,919 A | * | 5/1997 | MacCracken | H01J 37/3244 |
| | | | | 219/535 |
| 6,152,386 A | | 11/2000 | Bullock et al. | |
| 7,084,377 B2 | | 8/2006 | Raterman et al. | |
| 8,380,056 B2 | | 2/2013 | Evans | |
| 8,450,667 B2 | | 5/2013 | Gunzing et al. | |
| 2002/0129767 A1 | | 9/2002 | Czerwonka | |
| 2003/0007789 A1 | * | 1/2003 | Pagnella | H05B 3/58 |
| | | | | 392/472 |
| 2005/0008353 A1 | | 1/2005 | Lafitte | |
| 2010/0237061 A1 | * | 9/2010 | Tix | F16L 11/12 |
| | | | | 219/535 |
| 2012/0074120 A1 | * | 3/2012 | Massold | F02M 31/125 |
| | | | | 219/520 |
| 2014/0361099 A1 | | 12/2014 | Marsalek et al. | |
| 2015/0114494 A1 | | 4/2015 | Crawford | |
| 2015/0226362 A1 | | 8/2015 | Brudevold et al. | |
| 2015/0292651 A1 | * | 10/2015 | Moreau | B32B 37/24 |
| | | | | 156/149 |
| 2017/0045173 A1 | | 2/2017 | Wenzel et al. | |
| 2017/0234577 A1 | * | 8/2017 | Tix | F24H 1/101 |
| | | | | 392/488 |
| 2018/0042071 A1 | | 2/2018 | Damerow et al. | |
| 2018/0045342 A1 | * | 2/2018 | Gonzalez | F16L 11/10 |
| 2019/0024824 A1 | | 1/2019 | Bolea et al. | |

OTHER PUBLICATIONS

International Search Report and Written Opinion from PCT Application Serial No. PCT/US2021/065522, dated Mar. 28, 2022, 14 pages.

* cited by examiner

HEATED WHIP HOSE

CROSS-REFERENCE TO RELATED APPLICATION(S)

This application claims the benefit of U.S. Provisional Application No. 63/132,153 filed Dec. 30, 2020, for "Heated Whip Hose" by J. Tix, N. Peterson, N. Studt, and S. Schneider.

BACKGROUND

The disclosed invention relates generally to heated fluid delivery systems and more particularly to heated whip hoses.

Whip hoses are commonly used to apply spray foam and coatings. Whip hoses can provide flexibility near a location of a hand-held sprayer or other fluid delivery device. Whip hoses can include heating elements configured to heat the fluid or maintain a temperature of a fluid received from the main hose. Electrical heating elements typically extend a full length of the whip hose with an electrical connection disposed at the hand-held sprayer. Heating elements often fail at or along a length of the hose adjacent the sprayer due to increased bending during use. In comparison to conventional unheated whip hoses, heated whip hoses tend to be heavier, less durable, and less flexible.

An improved whip hose construction is needed to provide increased durability and flexibility with reduced weight for ease of use.

SUMMARY

A heated whip hose includes a hose core configured to deliver a fluid, a heating element disposed around the hose core, a protective layer disposed around the heating element and hose core, an insulating layer disposed around the protective layer, and an abrasion protection layer disposed around insulating layer and forming an outer sheath.

A heated whip hose assembly includes a first whip hose and a second whip hose. Each of the first and second whip hoses includes a first end configured to couple to a main hose, a second end configured to couple to a fluid delivery device, a hose core configured to deliver a fluid from the first end to the second end, a heating element disposed around the hose core, a protective layer disposed around the heating element and hose core and conforming to outer surfaces of the heating element and hose core, a first insulating layer disposed around the protective layer configured to direct radiant heat from the heating element toward the hose core, and an abrasion protection layer disposed around insulating layer and forming an outer sheath of the whip hose.

The present summary is provided only by way of example, and not limitation. Other aspects of the present disclosure will be appreciated in view of the entirety of the present disclosure, including the entire text, claims and accompanying figures.

Figure 1:
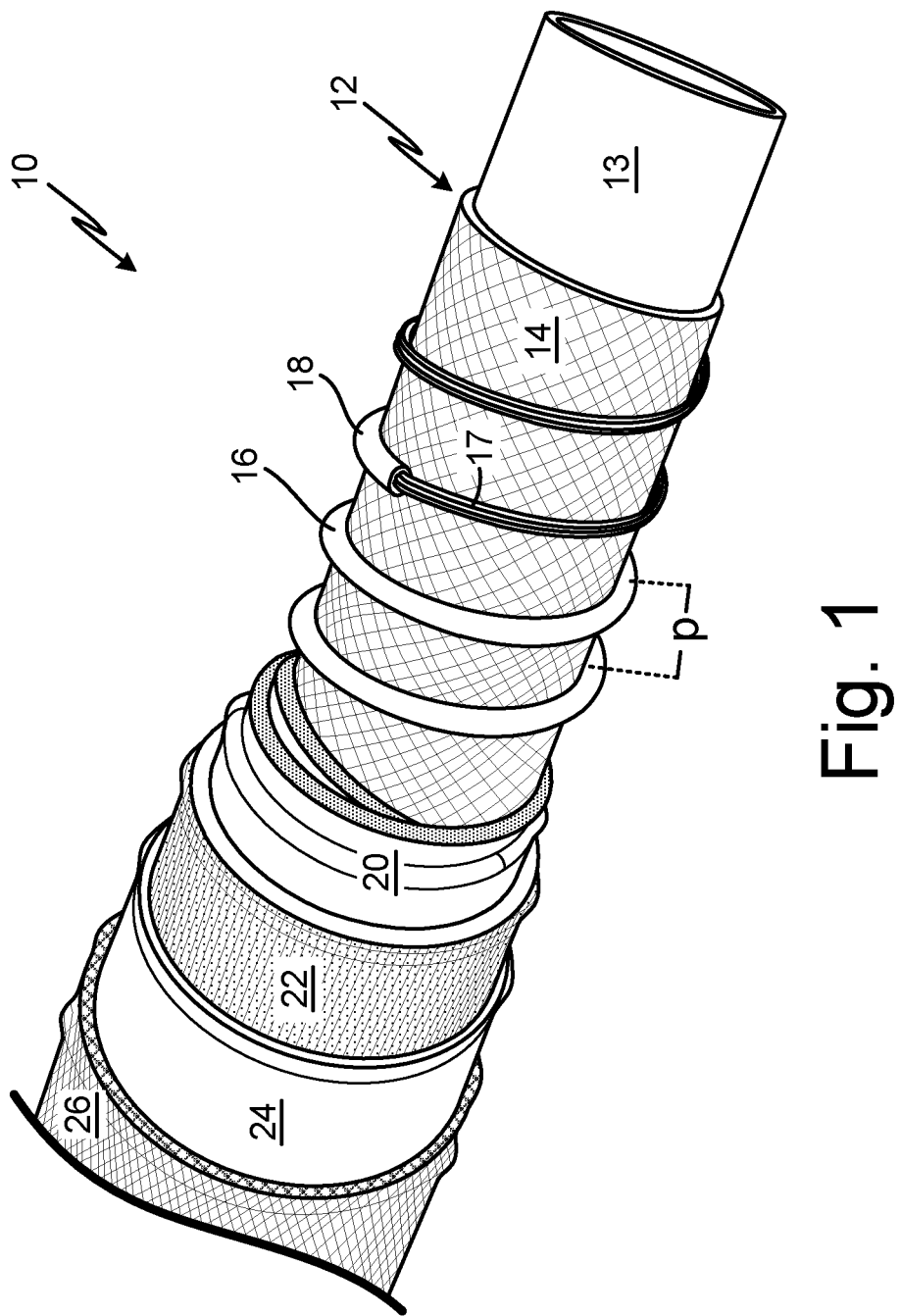
FIG. 1 is a perspective view of a heated whip hose layered construction.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

A multi-layered heated whip hose according to the present invention can be constructed to provide improved durability and reduced stiffness and weight over conventional thermoplastic whip hose designs. The whip hose can have a heated section and an unheated section provided by extending a heating element only a partial length of the whip hose. This can provide the whip hose with improved flexibility and can reduce the likelihood of failure by removing the heating element from a region typically subjected to increased bending. Furthermore, a single heating element can be extended down a length of the hose and back to eliminate the need for an electrical connection at a discharge end of the hose, where increased wear tends to occur. All electrical connections can be positioned in a location near where the whip hose is connected to a main hose. This enables a user to hold and use the whip hose with increased safety and reduces the potential for failure caused by wear.

FIG. 1 is a simplified perspective view of a heated whip hose layered construction. FIG. 1 shows a section of whip hose 10 having hose core 12 with tube 13 and reinforcing layer 14, heating element 16, protective layer 20, thermal insulating layer 22, radiant energy insulating layer 24, and abrasion protection layer 26. Portions of protective layer 20, thermal insulating layer 22, radiant energy insulating layer 24, and abrasion protection layer 26 have been cut away to show underlying layers.

Hose core 12 is a flexible tube configured for delivery of a fluid received from a main hose (not shown) to a fluid delivery device (not shown), such as a hand-held sprayer. Hose core 12 can be formed from a flexible, thermally conductive and impermeable material capable of conveying a liquid at elevated temperatures and pressures and capable of conducting heat from heating element 16 to a fluid in hose core 12. As illustrated in FIG. 1, hose core 12 can include tube 13 and reinforcing layer 14. Tube 13 can convey liquids at elevated temperatures and pressures. Reinforcing layer 14 is thermally conductive and both flexible and capable of providing compressive force to tube 13 when under pressure. Hose core 12 can be formed, for example, from an extruded polytetrafluoroethylene (PTFE) tube 13 reinforced with a stainless steel braid 14 as known in the art. Hose core 12 can have a nominal inner diameter typically ranging from 0.20 to 0.38 inches (5.1 to 9.7 mm) and outer diameter ranging from 0.3 to 0.7 inches (7.6 to 17.8 mm). Hose core 12 can have a working pressure rating up to about 3,000 psig and a bend radius ranging from about 3 to 8 inches (7.6 to 20.3 cm).

Heating element 16 extends along an outer surface of hose core 12. Heating element 16 can be placed in direct contact with the thermally conductive reinforcing layer 14 of hose core 12, which can transfer thermal energy from heating element 16 to a fluid in hose core 12. Heating element 16 can be a resistive heating element formed from one or more strands of a conductive wire 17, such as a tin copper heating wire. Heating wire 17 can have a circular cross-section to provide bending flexibility. Heating wire 17 can be jacketed, for example, with an ethylene tetrafluoroethylene (ETFE) sheath 18, which can be extruded with heating wire 17. Sheath 18 can also have a circular cross-section to provide bending flexibility. Sheath 18 can be a thermal conductor and electrical insulator. Sheath 18 can conduct thermal energy from the heating wire 17 to hose core 12 and can provide electrical insulation and abrasion protection for heating wire 17. A diameter and material of heating wire 17 can be selected to provide a resistance suitable for providing a desired thermal performance. As illustrated in FIG. 1, heating element 16 can be helically wound around hose core 12 with a pitch p selected to provide a desired thermal performance. Typically, whip hose 10 can be constructed to provide a thermal performance that matches a thermal performance of a main hose connected to whip hose 10 to maintain a desired fluid temperature.

Protective layer 20 is disposed around heating element 16 and hose core 12 to secure heating element 16 to hose core 12. Protective layer 20 can conform to outer surfaces of heating element 16 and hose core 12 thereby minimizing or eliminating gaps between protective layer 20 and heating element 16 and hose core 12. Protective layer 20 can be a self-vulcanizing material such as a high temperature silicone tape that can be wrapped around heating element 16 and hose core 12. Protective layer 20 can be wrapped in a manner such that each wrap layer overlaps with an underlying wrap layer to allow for self-fusing without the need for adhesives. Protective layer 20 can be wrapped to effectively provide two layers of thickness around hose core 12 and heating element 16. Protective layer 20 can be used to maintain a position of heating element 16 and provide additional protection of heating element 16. Protective layer 20 can be elastic to maintain a flexibility of whip hose 10.

Thermal insulating layer 22 is disposed around protective layer 20. Thermal insulating layer 22 can be formed of a heat-resistant fiber material, such as braided aramid fiber. Thermal insulating layer 22 has a low thermal conductivity to limit the amount of thermal energy transferred from heating element 16 away from hose core 12. Thermal insulating layer 22 can be a flexible material to maintain flexibility of whip hose 10. Thermal insulating layer 22 can be a flat braided tape, which can be wound around protective layer 20 in an overlapping manner (e.g., wrapped at ½ pitch) to effectively form two layers of insulation and can be wrapped to conform to an outer surface of protective layer 20. Thermal insulating layer 22 can be wrapped without use of an adhesive. Thermal insulating layer 22 can be a material capable of providing good insulation without significantly adding to a thickness of whip hose 10. For example, thermal insulating layer 22 can be made from woven fibers such as braided polyester or non-woven fiber such as a needle punched aramid having a width of about 3 inch (1.2 cm) and a thickness of about ⅛ inch (3.175 mm), contributing a total thickness of ¼ inch (6.35 mm) for two layers.

Radiant heat insulating layer 24 can provide an additional layer of insulation and can secure the position of thermal insulating layer 22. Radiant heat insulating layer 24 can be disposed around thermal insulating layer 22. Radiant heat insulating layer 24 can be a foil-lined polyester heat tape with a reflective foil surface arranged to face the hose core. Radiant heat insulating layer 24 can minimize radiant heat loss from whip hose 10 by blocking thermal infrared radiation emitted from heating element 16 and/or reflecting thermal infrared radiation emitted from heating element 16 back toward hose core 12. An air gap is not required between radiant heat insulating layer 24 and thermal insulating layer 22, however, may be beneficial if the operating temperature of whip hose 10 is above the rated temperature of radiant heat insulating layer 24 (e.g., greater than 300° F. (149° C.) in the disclosed embodiment). Use of a non-woven aramid fiber thermal insulating layer 22 can provide sufficient air gaps and thermal protection for radiant heat insulating layer 24. Radiant heat insulating layer 24 can be applied with or can include an adhesive material capable of bonding with thermal insulating layer 22 and can be wrapped with an overlap to ensure there are no gaps. Radiant heat insulating layer 24 can contribute minimally to the thickness of whip hose 10. For example, radiant heat insulating layer 24 can have a thickness of about 2 mils (0.05 mm).

Abrasion protection layer 26 can provide an outermost protective layer for whip hose 10. Abrasion layer 26 can be disposed around radiant heat insulating layer 24. Abrasion protection layer 26 can be a polyethylene sleeving such as a polyethylene braided tube. Abrasion protection layer 26 can protect whip hose 10 from external damage while maintaining whip hose flexibility.

Whip hose 10 can be manufactured in a variety of lengths. Typically, whip hoses have length ranging from 3 feet to 25 feet (1 to 7.6 m). Heating of whip hose 10 can be provided continuously or intermittently, as needed or as determined, for example, by a temperature sensor (not shown). The disclosed layered construction of whip hose 10 can provide improved performance over conventional thermoplastic designs, which have increased weight and stiffness and low durability. The disclosed layered whip hose construction provides improved heating, flexibility, ease of use, and durability.

Figure 2:
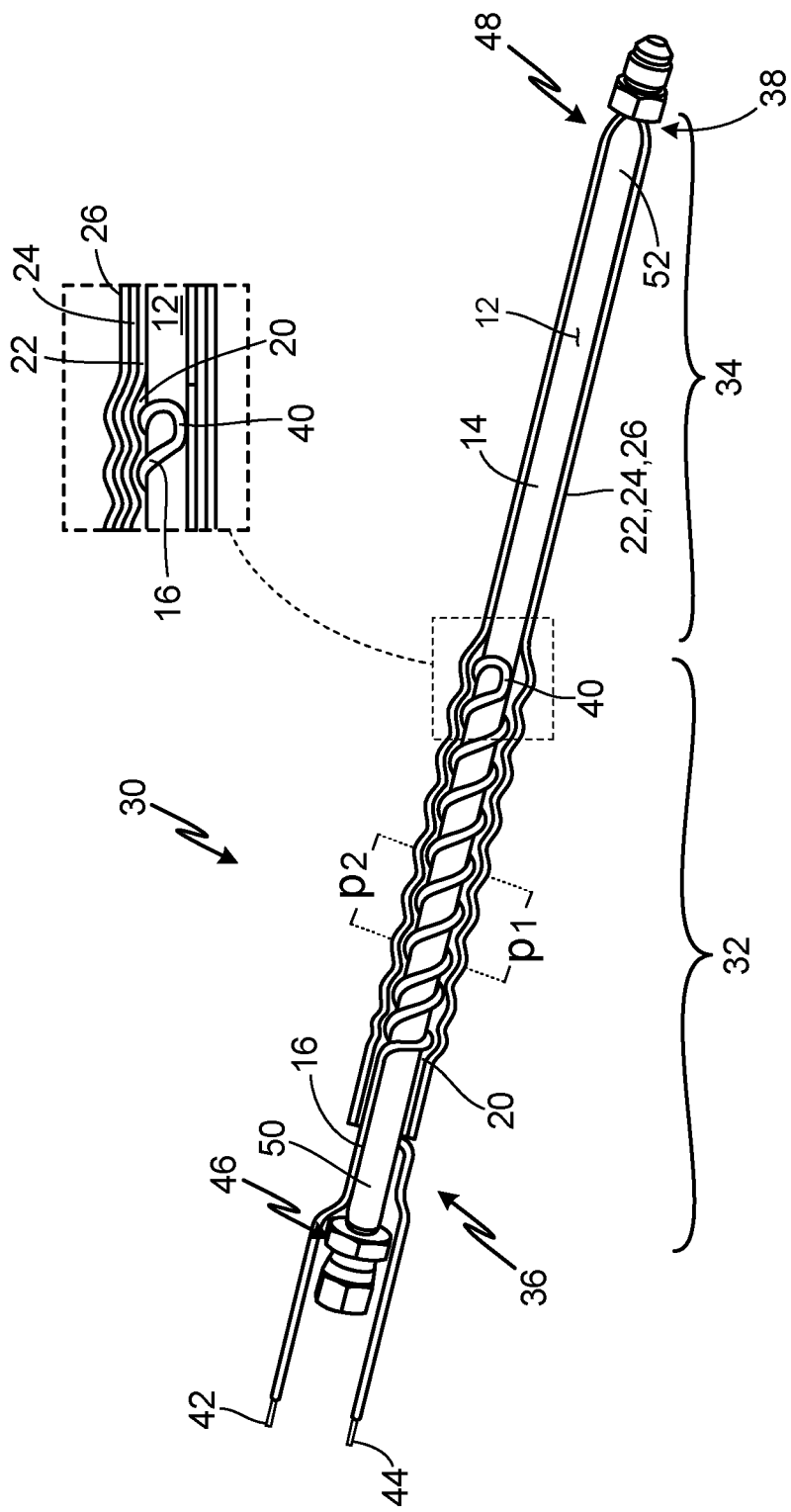
FIG. 2 is a perspective partial cross-section view of a whip hose with heated and unheated sections, and includes a close-up view of the whip hose at the intersection of the heated and unheated sections.

FIG. 2 is a perspective partial cross-sectional (cutaway) view of a whip hose constructed in accordance with whip hose 10 and having heated and unheated sections. FIG. 2 shows whip hose 30 having hose core 12, heating element 16, protective layer 20, thermal insulating layer 22, radiant heat insulating layer 24, and abrasion protection layer 26. Portions of protective layer 20, thermal insulating layer 22, radiant heat insulating layer 24, and abrasion protection layer 26 are shown cut away to expose underlying layers. Whip hose 30 includes heated section 32 and unheated section 34, ends 36, 38, heating element turn 40 and heating element electrical connection ends 42, 44, and fitting 46 and 48. End 36 is adjacent to fitting 46, which is configured to couple to a main hose (not shown). End 38 is disposed opposite end 36 and adjacent to fitting 48. Fitting 48 is configured to couple to a fluid delivery device, such as a hand-held sprayer (not shown). Heated section 32 and unheated section 34 are disposed in series with heated section 32 extending from end 36 to unheated section 34 and with unheated section 34 extending from heated section 32 to end 38. Whip hose 30 is formed of a continuous hose length that is uninterrupted between heated section 32 and unheated section 34. As such, there are no fittings connecting heated section 32 to unheated section 34. Turn 40 of heating element 16 is located adjacent to unheated section 34. Electrical connection ends 42 and 44 of heating element 16 extend from end 36 thereby locating an electrical connection at a single end of whip hose 30. An expanded close-up view at turn 40 is also provided.

Whip hose 30 is designed to maintain thermal performance while improving durability of whip hose 30 by omitting heating element 16 from a length of whip hose 30 typically subjected to increased bending during use. Increased bending of heating element 16 can cause wear, which can result in failure of heating element 16 over time. Heating element 16 can be helically wound around a partial length of hose core 12 to form heated section 32 and unheated section 34. The length of whip hose 30 in which heating element 16 is omitted is adjacent to end 38, which is configured to attach to a hand-held sprayer or other fluid delivery device. Typically, the greatest amount of wear on whip hose 30 is observed within the region 12 to 18 inches from end 38. As such, unheated section 34 can generally extend about 12 to 18 inches (30.5 to 45.7 cm) from end 38. Preferably, unheated region extends greater than about 6 inches (15.2 cm) from end 38 to improve durability and less than about 24 inches (61 cm) from end 38 to minimize heat loss. However, in some examples, unheated section 34 can extend up to approximately 72 inches (approximately 2 meters) from end 38 for applications requiring extended lengths of flexibility. In some examples, unheated section 34 can extend a length of 6 to 12 inches (15.2 to 30.5 cm). In some examples, unheated section 34 can extend a length of 12.1 to 18 inches (30.7-45.7 centimeters) from end 38. In some examples, unheated section 34 can extend or a length of 18.1 to 24 inches (46-61 centimeters) from end 38. In some examples, unheated section 34 can extend a length of 24.1 to 30 inches (61.2-76.2 centimeters) from end 38. In some examples, unheated section 34 can extend a length of 30.1 to 36 inches (76.5-91.4 centimeters) from end 38. In some examples, unheated section 34 can extend a length of 36.1 to 42 (91.7-106.7 centimeters) inches from end 38.

As illustrated in FIG. 2, heated section 32 includes hose core 12, heating element 16, protective layer 20, thermal insulating layer 22, radiant heat insulating layer 24, and abrasion protection layer 26. Unheated section 34 includes hose core 12, thermal insulating layer 22, radiant heat insulating layer 24, and abrasion protection layer 26. Both heating element 16 and protective layer 20 are omitted from unheated section 34. As illustrated, an outer diameter of unheated section 34 is reduced in the absence of heating element 16 and protective layer 20. As such, an outer diameter of whip hose 30 narrows from heated section 32 to unheated section 34.

Heating element 16 can be helically wound around hose core 12 in heated section 32 as described with respect to FIG. 1. Heating element 16 can be helically wound along the length of whip hose 30 from end 36 to unheated section 34. At unheated section 34, heating element can include turn 40 from which heating element 16 can be wound back to end 36. Heating element 16 folds back at turn 40 such that heating element 16 can be helically wound back to end 36 without overlapping itself. Heating element 16 can be wound from end 36 at pitch p1 and wound back at an equal pitch p2 spaced at ½ pitch to provide uniform spacing across heated section 32.

Turn 40 of heating element 16 can be secured to hose core 12. For example, turn 40 can be secured to hose core 12 with a high temperature adhesive material, such as a high temperature glass tape, or other type of fastener. Protective layer 20 can be wound around heating element 16 and hose core 12 as described with respect to FIG. 1. Protective layer 20 can extend from fitting 46 at end 36 to unheated section 34 and can be discontinued in unheated section 34. Protective layer 20 protects heating element 16 from external damage and is not needed in unheated section 34.

Unheated section 34 includes hose core 12, thermal insulating layer 22, radiant heat insulating layer 24, and abrasion protection layer 26. In the absence of heating element 16 and protective layer 20, thermal insulating layer 22 is wound directly around and disposed in contact with reinforcing layer 14 of hose core 12. Thermal insulating layer 22 can be held in place with radiant heat insulating layer 24, which is sheathed in abrasion protection layer 26.

As illustrated in FIG. 2, hose core 12 is continuous between fittings 46 and 48. Heating element 16 and protective layer 20 are discontinued in unheated section 34. Each of thermal insulating layer 22, radiant heat insulating layer 24, and abrasion protection layer 26 is continuous between fittings 46 and 48. The outer diameter of heated section 32 is reduced by about a diameter of heating element 16 and a thickness of two layers of protective layer 20 in unheated section 34. The continuation of thermal insulating layer 22 and radiant heat insulting layer 24 in unheated section 34 limits heat loss from whip hose 30 and thereby helps maintain a temperature of the heated fluid in hose core 12 between heated section 32 and end 38.

End 36 includes fitting 46 for coupling whip hose 30 to a main hose. End 38 includes fitting 48 for coupling whip hose 30 to a fluid delivery device, such as a hand-held sprayer. Each of fittings 46 and 48 can include a metal ferrule 50, 52 secured to opposite ends of hose core 12 as known in the art. Ferrules 50, 52 can be fit to an outer surface of hose core 12. Heating element 16 is disposed around ferrule 50 and end 36. As illustrated in FIG. 2, in some examples, protective layer 20, thermal insulating layer 22, radiant heat insulating layer 24, and abrasion protection layer 26 can extend to ferrule 50 at end 36 but do not fully cover ferrule 50. Thermal insulating layer 22, radiant heat insulating layer 24, and abrasion protection layer 26 can extend over ferrule 52 at end 38.

Heating element electrical connections ends 42, 44 extend from end 36 of whip hose 30. Electrical connection ends 42 and 44 can be coupled to a power source configured to supply electricity to heating element 16. Typically, whip hoses include electrical connections at both the end connected to the main hose and the end connected to the hand-held sprayer. Such design is susceptible to failure due to increased wear along a length of the whip hose adjacent to the hand-held sprayer. The disclosed whip hose with electrical connection at a single end improves durability by locating heating element 16 away from a region of high wear and increases safety by moving the electrical connection away from the user.

Whip hose 30 can provide thermal performance with increased durability over conventional heated whip hose designs. The addition of unheated section 34 along a length of whip hose 30 most susceptible to wear due to increased bending can increase the durability and lifespan of whip hose 30. The continuation of insulating layers 18 and 20 over unheated section 32 can reduce heat loss and thereby help maintain a temperature of the heated fluid through a full length of whip hose 30.

Figure 3:
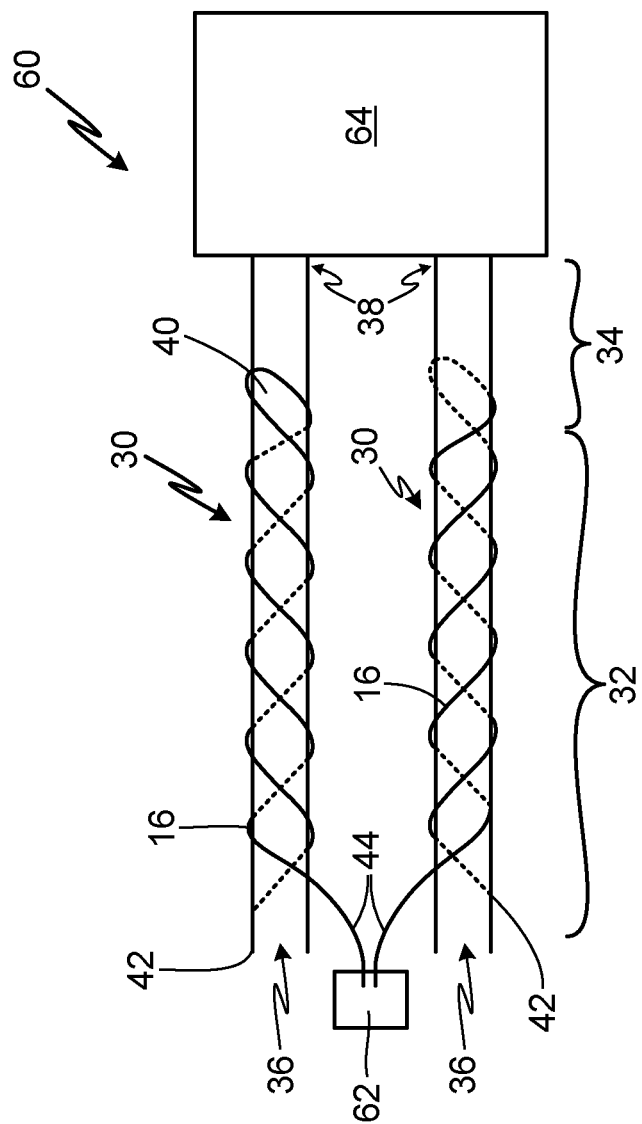
FIG. 3 is a simplified view of a whip hose assembly for delivery of dual-component materials with whip hoses constructed according to FIGS. 1 and 2.

FIG. 3 is a simplified view of a whip hose assembly with whip hoses constructed according to FIGS. 1 and 2. FIG. 3 shows whip hose assembly 60 having whip hoses 30 with ends 36 and 38, heating elements 14 with heating element electrical connection ends 42, 44, electrical junction 62, hand-held sprayer 64. As described with respect to FIG. 2, electrical connection ends 42, 44 of heating element 16 extend from end 36 of each whip hose 30. Electrical ends 44 are joined at electrical junction 62. End 38 of each whip hose 30 is coupled to hand-held sprayer 64. End 36 of each whip hose 30 is configured to couple to a separate main hose (not shown).

Whip hose assembly 60 can be configured for use with a dual-component pump system for simultaneous delivery of two different materials, which can mix and react upon delivery to hand-held sprayer 64. For example, whip hose assembly 60 can be used to deliver polyurethane foam systems in which a resin material and a catalyst material are conveyed to a sprayer in separate whip hoses 30 and which react upon mixing to form a solidified foam material. The application of heat to materials in separate whip hoses 30 can be required to ensure proper reaction upon mixing. As described with respect to FIG. 2, whip hose assembly 60 provides improved durability and safety over conventional heated whip hose designs by locating heating element 16 away from a region of high wear and moving the electrical connection away from the user.

Heating element 16 can be helically wound around hose core 12 as described with respect to FIG. 2 and as illustrated in FIG. 3, including fold 40, such that heating element 16 does not overlap itself. Whip hose 30 can be constructed as provided in FIG. 2 with heated section 32 and unheated section 34. Alternatively, heating element 16 can extend a full nearly full length of whip hose 30. As previously described, whip hose 30 can provide thermal performance with increased durability over conventional heated whip hose designs. The addition of unheated section 34 along a length of whip hose 30 most susceptible to wear due to increased bending can increase the durability and lifespan of whip hose 30. The continuation of insulating layers 22 and 24 over unheated section 32 can reduce heat loss and thereby help maintain a temperature of the heated fluid through a full length of whip hose 30.

Electrical connection ends 42, 44 of heating element 16 extend from end 36 of each whip hose 30. Electrical connection ends 42 of whip hoses 30 can be coupled to a power supply. Electrical connection ends 44 can be joined in electrical junction 62, such that heating elements 18 are connected and electrical power can be supplied to both heating elements 18 from a single electrical connection (not shown). Locating electrical junction 62 away from sprayer increases user safety and improves durability of whip hose assembly 60.

The multi-layered construction of whip hoses 10 and 30 provide improved durability and reduced stiffness and weight over conventional thermoplastic whip hose designs. Providing an unheated section to whip hose 30 can provide improved flexibility and can reduce the likelihood of failure by removing the heating element from a region subjected to increased bending. Furthermore, locating the electrical connection at an end of the whip hose configured to couple to a main hose improves safety and durability of the whip hose.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A heated whip hose includes a hose core configured to deliver a fluid, a heating element disposed around the hose core, a protective layer disposed around the heating element and hose core, an insulating layer disposed around the protective layer, and an abrasion protection layer disposed around insulating layer and forming an outer sheath.

The heated whip hose of the preceding paragraph can optionally include, additionally and/or alternatively, any one or more of the following features, configurations and/or additional components:

The heated whip hose of the preceding paragraph, wherein the hose core comprises a reinforcing material.

The heated whip hose of any of the preceding paragraphs, wherein the reinforcing material is a stainless-steel braid.

The heated whip hose of any of the preceding paragraphs, wherein the protective layer conforms to outer surfaces of the heating element and hose core.

The heated whip hose of any of the preceding paragraphs, wherein the protective layer is a self-vulcanizing material.

The heated whip hose of any of the preceding paragraphs, wherein the protective layer is a high temperature silicone tape.

The heated whip hose of any of the preceding paragraphs, wherein the insulating layer comprises a thermal insulating layer formed of a heat-resistant fiber material.

The heated whip hose of claim 10, wherein the insulating layer is an aramid fiber material.

The heated whip hose of any of the preceding paragraphs, wherein the insulating layer further comprises a radiant heat insulating layer disposed around the thermal insulating layer.

The heated whip hose of any of the preceding paragraphs, wherein the radiant heat insulating layer is a foil-lined material and wherein a reflective foil surface faces the hose core.

The heated whip hose of any of the preceding paragraphs, wherein the radiant heat layer is a foil-lined polyester tape.

The heated whip hose of any of the preceding paragraphs, wherein the abrasion protection layer is a polyethylene sleeving.

The heated whip hose of any of the preceding paragraphs, wherein the polyethylene sleeving is a braided tube.

The heated whip hose of any of the preceding paragraphs, wherein the heating element is an electrically conductive wire.

The heated whip hose of any of the preceding paragraphs, wherein the electrically conductive wire is sheathed in ETFE.

The heated whip hose of any of the preceding paragraphs, wherein the heating element is disposed around a partial length of the hose core to form a heated section and an unheated section, wherein the heated section extends from a first end configured to couple to a main hose and wherein the unheated section extends from a second end opposite the first end, the second end configured to couple to a fluid delivery device.

The heated whip hose of any of the preceding paragraphs, wherein the unheated section extends a length up to about 72 inches (1.8 meters) from the second end of the heated whip hose opposite the first end, the second end configured to couple to a fluid delivery device.

The heated whip hose of any of the preceding paragraphs, wherein the unheated section extends a length less than about 24 inches (61 centimeters) from the second end.

The heated whip hose of any of the preceding paragraphs, wherein the unheated section extends a length greater than about 6 inches (15.2 centimeters) from the second end.

The heated whip hose of any of the preceding paragraphs, wherein the unheated section extends a length of about 12 inches to 18 inches (30.5 centimeters to 45.7 centimeters) from the second end.

The heated whip hose of any of the preceding paragraphs wherein the unheated section extends a length selected from the lengths consisting of 6-12 inches (15.2-30.5 centimeters), 12.1-18 inches (30.7-45.7 centimeters), 18.1-24 inches (46-61 centimeters), 24.1-30 inches (61.2-76.2 centimeters), 30.1-36 inches (76.5-91.4 centimeters), and 36.1-42 inches (91.7-106.7 centimeters) from the second end.

The heated whip hose of any of the preceding paragraphs, wherein the heating element is helically wound around the hose core.

The heated whip hose of any of the preceding paragraphs, wherein the heating element is wound with a uniform pitch.

The heated whip hose of any of the preceding paragraphs, wherein the heating element is helically wound around a partial length of the hose core to form the heated section and an unheated section.

The heated whip hose of any of the preceding paragraphs, wherein the heating element is helically wound from a first end of the whip hose to the unheated section of the whip hose and back to the first end, wherein the first end is configured to couple to the main hose.

The heated whip hose of any of the preceding paragraphs, wherein the heating element includes a turn at the unheated section, wherein the turn is secured to the hose core.

The heated whip hose of any of the preceding paragraphs, wherein first and second ends of the heating element are located at the first end of the whip hose where the heating element is coupled to an electrical connection.

A heated whip hose assembly comprising a first and a second of the heated whip hose of any of the preceding paragraphs, wherein the second ends of the heating elements of the first and second heated whip hoses are coupled in an electrical connection at the first ends of the whip hoses.

A heated whip hose assembly includes a first whip hose and a second whip hose. Each of the first and second whip hoses includes a first end configured to couple to a main hose, a second end configured to couple to a fluid delivery device, a hose core configured to deliver a fluid from the first end to the second end, a heating element disposed around the hose core, a protective layer disposed around the heating element and hose core and conforming to outer surfaces of the heating element and hose core, a first insulating layer disposed around the protective layer configured to direct radiant heat from the heating element toward the hose core, and an abrasion protection layer disposed around insulating layer and forming an outer sheath of the whip hose.

The assembly of the preceding paragraph can optionally include, additionally and/or alternatively, any one or more of the following features, configurations and/or additional components:

The assembly of the preceding paragraph, wherein the first insulating layer comprises a foil.

The assembly of any of the preceding paragraphs can further include a second insulating layer disposed between the hose core and the first insulating layer, wherein the second insulating layer is formed of an aramid fiber.

The assembly of any of the preceding paragraphs, wherein the heating element is disposed around a partial length of the hose core forming a heated section and an unheated section, wherein the unheated section is adjacent to the second end.

The heated whip hose assembly of any of the preceding paragraphs, wherein the unheated section extends a length up to about 72 inches (1.8 meters) from the second end.

The heated whip hose assembly of any of the preceding paragraphs, wherein the unheated section extends a length less than about 24 inches (61 centimeters) from the second end.

The heated whip hose assembly of any of the preceding paragraphs, wherein the unheated section extends a length greater than about 6 inches (15.2 centimeters) from the second end.

The heated whip hose of any of the preceding paragraphs, wherein the unheated section extends a length of about 12 inches to 18 inches (30.5 centimeters to 45.7 centimeters) from the second end.

The heated whip hose of any of the preceding paragraphs, wherein the unheated section extends a length selected from the lengths consisting of 6-12 inches (15.2-30.5 centimeters), 12.1-18 inches (30.7-45.7 centimeters), 18.1-24 inches (46-61 centimeters), 24.1-30 inches (61.2-76.2 centimeters), 30.1-36 inches (76.5-91.4 centimeters), and 36.1-42 inches (91.7-106.7 centimeters) from the second end.

The heated whip hose of any of the preceding paragraphs, wherein the heating element is helically wound around the hose core.

The heated whip hose of any of the preceding paragraphs, wherein the unheated section extends a length of less than about 24 inches (61 centimeters) from the second end.

The assembly of any of the preceding paragraphs, wherein the protective layer is discontinued in the unheated section.

The assembly of any of the preceding paragraphs, wherein the first and second insulating layers extend from the first end to the second end.

The assembly of any of the preceding paragraphs, wherein the heating element has a first electrical connection and a second electrical connection, wherein the first and second electrical connections are located at the first end.

The assembly of any of the preceding paragraphs, wherein the second electrical connection of the first whip hose is electrically connected to the second electrical connection of the second whip hose.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heated whip hose comprising:
   a hose core configured to deliver a fluid, the hose core extending from a first terminal end configured to couple to a main hose, to a second terminal end opposite the first terminal end, the second terminal end configured to couple to a fluid delivery device;
   a heating element disposed around the hose core;

a protective layer disposed around the heating element and hose core;
an insulating layer disposed around the protective layer; and
an abrasion protection layer disposed around insulating layer and forming an outer sheath;
wherein the heating element is disposed around a partial length of the hose core to form a heated section including the heating element and an unheated section not including the heating element, wherein the heated section extends from the first terminal end, and wherein the unheated section extends from the heated section to the second terminal end.

2. The heated whip hose of claim 1, wherein the hose core comprises a reinforcing material.

3. The heated whip hose of claim 1, wherein the protective layer conforms to outer surfaces of the heating element and hose core.

4. The heated whip hose of claim 3, wherein the protective layer is a self-vulcanizing high temperature silicone tape.

5. The heated whip hose 1, wherein the insulating layer comprises:
a thermal insulating layer formed of a heat-resistant fiber material; and
a radiant heat insulating layer disposed around the thermal insulating layer.

6. The heated whip hose of claim 5, wherein the insulating layer is an aramid fiber material.

7. The heated whip hose of claim 5, wherein the radiant heat insulating layer is a foil-lined polyester tape and wherein a reflective foil surface faces the hose core.

8. The heated whip hose of 1, wherein the abrasion protection layer is a polyethylene sleeving.

9. The heated whip hose of claim 8, wherein the polyethylene sleeving is a braided tube.

10. The heated whip hose 1, wherein the heating element is an electrically conductive wire.

11. The heated whip hose of claim 10, wherein the electrically conductive wire is sheathed in ethylene tetrafluoroethylene (ETFE).

12. The heated whip hose of claim 1, wherein the unheated section extends a length up to about 72 inches from the second terminal end.

13. The heated whip hose of claim 1, wherein the unheated section extends a length less than about 24 inches from the second terminal end.

14. The heated whip hose of claim 13, wherein the unheated section extends a length greater than about 6 inches from the second terminal end.

15. The heated whip hose of claim 1, wherein the unheated section extends a length of about 12 inches to 18 inches from the second terminal end.

16. The heated whip hose of claim 1, wherein the unheated section extends a length selected from the lengths consisting of 6-12 inches, 12.1-18 inches, 18.1-24 inches, 24.1-30 inches, 30.1-36 inches, and 36.1-42 inches from the second terminal end.

17. The heated whip hose of claim 1, wherein the heating element is helically wound around the hose core.

18. The heated whip hose of claim 17, wherein the heating element is wound with a uniform pitch.

19. The heated whip hose of claim 17, wherein the heating element includes a turn at the unheated section such that there is a change in the direction the heating element is wound, wherein the turn is secured to the hose core.

20. The heated whip hose of claim 19, wherein first and second ends of the heating element are located at a first end of the whip hose where the heating element is coupled to an electrical connection, and wherein the heating element is wound from the first terminal end to the unheated section and from the unheated section back to the first terminal end.

21. A heated whip hose assembly comprising a first and a second of the heated whip hose of claim 20, wherein the second ends of the heating elements of the first and second heated whip hoses are coupled in an electrical connection at the first ends of the whip hoses.

22. A heated whip hose assembly comprising:
a first whip hose and a second whip hose, each of the first and second whip hoses comprising:
a first terminal end configured to couple to a main hose;
a second terminal end configured to couple to a fluid delivery device;
a hose core configured to deliver a fluid from the first terminal end to the second terminal end;
a heating element disposed around the hose core, wherein the heating element is disposed around a partial length of the hose core forming a heated section including the heating element and an unheated section not including the heating element, wherein the heated section extends from the first terminal end and the unheated section extends from the heated section to the second terminal end;
a protective layer disposed around the heating element and hose core, wherein the protective layer conforms to outer surfaces of the heating element and hose core;
a first insulating layer disposed around the protective layer configured to direct radiant heat from the heating element toward the hose core;
an abrasion protection layer disposed around insulating layer and forming an outer sheath of the whip hose.

23. The heated whip hose assembly of claim 22, wherein the unheated section extends a length less than about 23 inches from the second terminal end.

24. The heated whip hose of claim 22, wherein the protective layer is discontinued in the unheated section.

25. The heated whip hose assembly of claim 24, wherein the heating element has a first electrical connection and a second electrical connection, wherein the first and second electrical connections are located at the first terminal end, and wherein the second electrical connection of the first whip hose is electrically connected to the second electrical connection of the second whip hose.

26. A heated whip hose assembly comprising:
a first whip hose and a second whip hose, each of the first and second whip hoses comprising:
a first end configured to couple to a main hose;
a second end configured to couple to a fluid delivery device;
a hose core configured to deliver a fluid from the first end to the second end;
a heating element disposed around the hose core, wherein the heating element is disposed around a partial length of the hose core forming a heated section and an unheated section, wherein the unheated section is adjacent to the second end;
a protective layer disposed around the heating element and hose core, wherein the protective layer conforms to outer surfaces of the heating element and hose core and wherein the protective layer is discontinued in the unheated section;
a first insulating layer disposed around the protective layer configured to direct radiant heat from the heating element toward the hose core;

an abrasion protection layer disposed around insulating layer and forming an outer sheath of the whip hose.

* * * * *